UNITED STATES PATENT OFFICE.

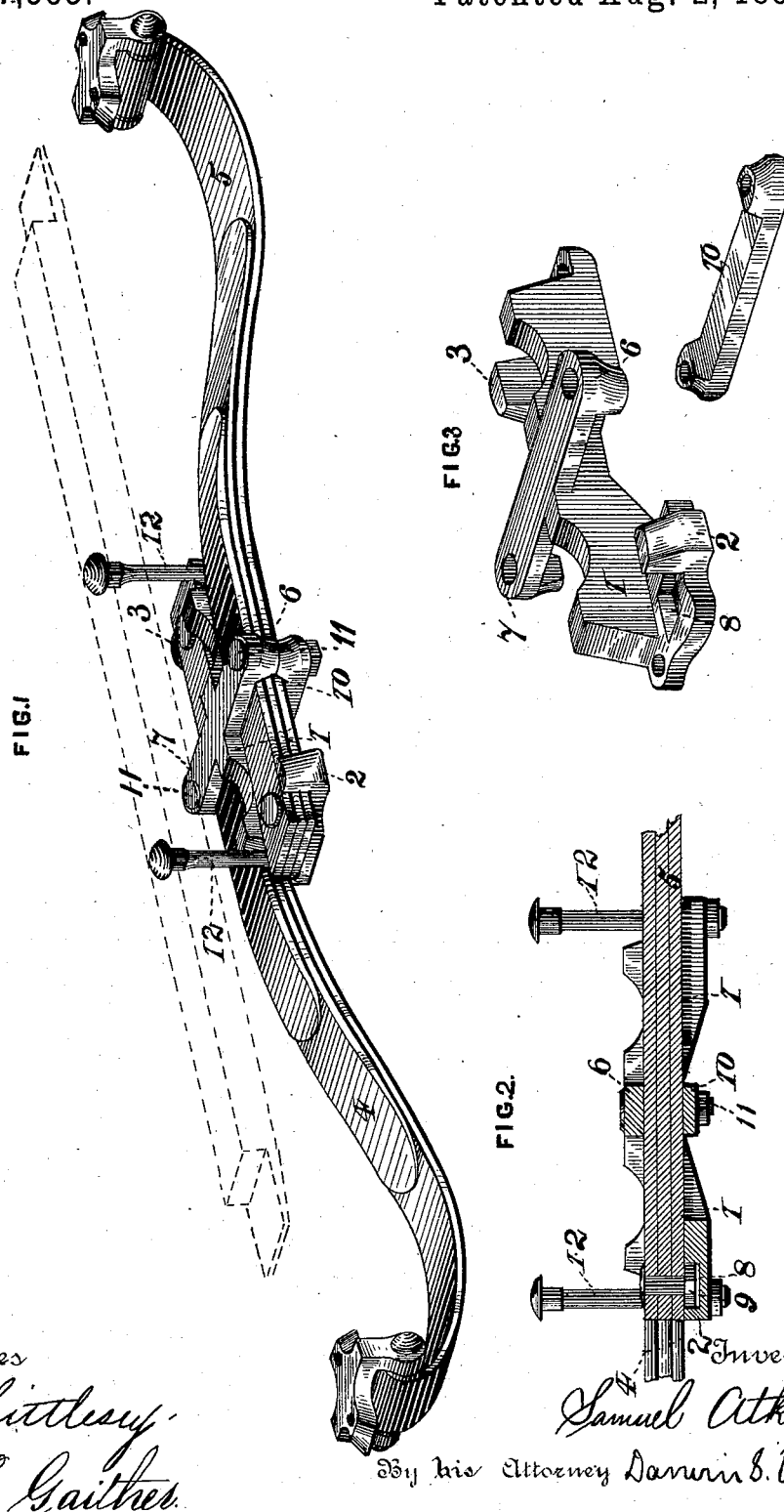

SAMUEL ATKINSON, OF CINCINNATI, OHIO.

VEHICLE-SPRING.

SPECIFICATION forming part of Letters Patent No. 367,353, dated August 2, 1887.

Application filed May 3, 1887. Serial No. 236,938. (No model.)

*To all whom it may concern:*

Be it known that I, SAMUEL ATKINSON, a subject of the Queen of Great Britain, residing at Cincinnati, in the county of Hamilton and State of Ohio, have invented or discovered certain new and useful Improvements in Vehicle-Springs, of which improvements the following is a specification.

The invention herein relates to certain improvements in couplings for connecting sectional springs together, and to the body or spring-bars of a vehicle without the intervention of bolts, except such as are needed to connect the coupling to the body or spring-bars.

In general terms, the invention consists in the construction and combination of parts substantially as hereinafter more fully described and claimed.

In the accompanying drawings, forming a part of this specification, Figure 1 is a perspective of a pair of sectional springs united by my improved coupling. Fig. 2 is a longitudinal sectional view through the spring 4, Fig. 1. Fig. 3 shows the bridge and cross-bar in perspective.

The coupling consists of the bridge-piece 1, provided at both ends, but on opposite sides, with the hooks 2 and 3, adapted to receive and support the ends of the sections 4 and 5, forming the spring. Midway of the length of the bridge and on opposite sides thereof are formed the inverted hooks 6 and 7, constructed to bear upon the spring-sections and prevent any outward movement thereof from the bridge 1.

In assembling the several parts above referred to, the inner end of one spring-section is passed under the middle, 6, on one side of the bridge, and over the end hook, 2, on the same side of the bridge, the inner end of the spring-section resting upon the hook 2. The other spring-section, 5, is inserted from the opposite direction under the hook 7 and over the hook 3.

It is not essential that the hooks 6 and 7 should be located opposite each other and midway of the length of the bridge, as the same function would be effected if, for example, the hook 6 were located directly opposite the end hook, 3, and the hook 7 opposite the hook 2, or if the hooks 6 and 7 were located nearer the companion hooks 2 and 3, respectively, than the middle of the bridge.

In order to prevent any longitudinal movement of the spring-sections with reference to the coupling, a recess, 8, is formed in the upper side of each of the hooks 2 and 3 for the reception of the head or nut on the bolt 9, employed for clamping the leaves of the spring-sections together. (See Figs. 2 and 3.)

In order to prevent any rattling or working of the spring-sections in the coupling, I employ a cross-bar, 10, passing under the spring-sections in line with the hooks 6 and 7, and held in place by the bolts 11, passing through the ends of the hooks and the cross-bar.

The coupling is secured to the body or spring-bar of the vehicle by bolts 12 passing through the bridge 1 and between the springs. The outer ends of the springs are provided with the ordinary shackles for attachment to the side bars or axles of the vehicle.

I claim herein as my invention—

1. The combination of the sectional springs, the bridge-piece provided with oppositely-arranged hooks on each side thereof, and means for securing the bridge to the body or spring-bar of the vehicle, substantially as set forth.

2. The combination of the sectional springs, the bridge-piece provided at its ends with hooks 2 and 3, and with the inverted hooks 6 and 7, the cross-bar 10, and means for attaching the bridge to the body or cross-bar of the vehicle, substantially as set forth.

3. The combination of the sectional springs, the bridge-piece provided at its ends with hooks 2 and 3, recessed as described, and having the hooks 6 and 7, and bolts passing through the bridge-piece for connecting the bridge to the body or cross-bar of the vehicle, substantially as set forth.

In testimony whereof I have hereunto set my hand.

SAMUEL ATKINSON.

Witnesses:
WM. W. TUGMAN,
J. L. WAITMANN.